United States Patent Office 2,910,369
Patented Oct. 27, 1959

2,910,369

SODIUM FREE MEAT CURING

Samuel Klein, Newark, N.J.

No Drawing. Application April 21, 1959
Serial No. 807,776

15 Claims. (Cl. 99—159)

This invention relates to sodium-free meat curing and, more particularly, relates to sodium-free meat curing compositions, methods of using said compositions, and methods of making said compositions. The preferred form of the present invention relates to sodium-free nitrite-nitrate meat curing utilizing a curing composition having a potassium and calcium content in about the same ratio as the potassium and calcium content of the meat being cured.

This application is a continuation-in-part of application Serial No. 641,229, filed February 19, 1957, now abandoned.

The present invention is directed to curing meats utilizing sodium-free meat-curing compositions in order to obtain meat for those consumers who, for medical reasons, must be on a low sodium diet. Such consumers comprise about 10% of the population.

It is the considered opinion of modern medical science that the use and intake of foods containing the sodium ion should be restricted or reduced in cardiac conditions, hypertension, arteriosclerosis, certain complications of pregnancy, insomnia, tension states, some types of dermatitis, tuberculosis, edemas, as well as in degenerative or malignant conditions associated with the geriatric groups of the population.

Sodium is the significant electrolyte which creates the aggravated symptoms so prevalent in the aforementioned conditions. The chloride ion performs the opposite effect. More specifically, the chlorides of an alkaline metal, such as potassium, or of an alkaline earth metal, such as calcium, exert this opposite effect. Additionally, the potassium ion is physiologically one of the most important elements of the body, this ion being required for normal cardiac action and protein biosynthesis, particularly in muscle and carbohydrate metabolism. Of equal importance is the calcium ion which diminishes edemas and prevents their formation. This action is due to the decreased permeability produced in the endothelium of the blood vessels, thereby retarding the passage of salt and water from the blood.

In view of the beneficial effect of the potassium and calcium ions, as set forth above, the present invention utilizes such ions in the curing of meat instead of using sodium ions.

It has also been found that the sodium-free composition of the present invention results in quick-curing meats, the cured meats being of good palatability, appearance and color, and possessing good keeping qualities.

According to one aspect of the present invention, the sodium-free composition contains potassium and calcium ions in approximately the same proportion as these ions are present in the meat being cured. By maintaining such a balance in the curing composition, the cured meat has excellent organoleptic qualities and the mineral content of the meat is physiologically in harmony with the mineral balance of the tissues of the consumer of the meat.

It is an object of the present invention to provide a sodium-free meat-curing composition and method of curing meats, utilizing this composition.

It is a further object of the present invention to provide a method of preparing said sodium-free composition.

These and other objects will be readily apparent from the hereinafter detailed description.

Lean raw beef has a potassium content between about 200–360 mg. per 100 grams of meat and a calcium content between about 9–20 mg. per 100 grams of meat.

Ham has a potassium content between about 110–260 mg. per 100 grams and a calcium content between about 9–13 mg. per 100 grams.

Tongue has a potassium content between about 220–260 mg. per 100 grams and a calcium content between about 22–31 mg. per 100 grams.

In view of the above variations in the potassium and calcium content of meat, in order to provide the best meat-curing composition in accordance with the present invention, the potassium and calcium content of the curing composition must be varied accordingly, so that in the final composition, the ratio of potassium and calcium approximates the potassium and calcium content of the meat being cured.

EXAMPLE 1

In Table I, set forth below, are exemplary sodium-free compositions used for curing beef, ham or tongue, the table showing the amount of each ingredient per gallon of aqueous solution.

Table I

|  | Beef | | Ham | | Tongue | |
|---|---|---|---|---|---|---|
|  | Grains | Approx. rel. weight | Grains | Approx. rel. weight | Grains | Approx. rel. weight |
| Potassium chloride (Anhyd.) | 2,387 | 96 | 2,253 | 90 | 1,720 | 68 |
| Calcium chloride (CaCl₂.2H₂O) | 239 | 10 | 208 | 8 | 370 | 15 |
| Potassium glutamate | 460 | 19 | 434 | 18 | 332 | 13 |
| Potassium nitrite (anhyd.) | 70 | 3 | 66 | 3 | 51 | 2 |
| Calcium nitrate (Ca(NO₃)₂.4H₂O) | 35 | 1½ | 26 | 9 | 54 | 2 |
| Sugar | 525 | 21 | 525 | 21 | 525 | 21 |
| Ascorbic acid | 34 | 1½ | 34 | 1½ | 34 | 1½ |
| Total weight | 3,750 |  | 3,546 |  | 3,086 |  |
| Approx. potassium content | 1,380 |  | 1,302 |  | 995 |  |
| Approx. calcium content | 72 |  | 62 |  | 113 |  |

Each of the formulations set forth in Table I are used to cure the appropriate meat wherein the ratio of the potassium and calcium content approximate that of the specific formulation. The methods of curing and utilizing these formulations will be set forth hereinafter.

Broadly, the preferred range of ingredients encompassing formulations for various kinds of meats are set forth in Table II.

Table II

|  | Grains per gallon of pickling composition | Relative proportions by weight |
|---|---|---|
| Potassium chloride | 1,720–2,387 | 68–96 |
| Calcium chloride | 208–370 | 8–15 |
| Potassium glutamate | 332–460 | 13–19 |
| Potassium nitrite | 50–70 | 2–3 |
| Calcium nitrate | 25–54 | 1–2 |
| Sugar | 250–525 | 10–21 |
| Ascorbic acid | 25–398 | 1–16 |

In preparing the meat-curing compositions of the present invention, the sugar may be any sugar conventionally used in such compositions, such as dextrose, sucrose, or malt sugars. In the event it is desired to provide a sugar free cure, the sugar may be omitted. Therefore, the range of sugar in the composition varies between about 0–21 parts.

In addition, processers of meat frequently add to the nitrite-nitrate curing composition other flavors and spices. Such ingredients may be optionally added to the curing compositions of the present invention if so desired.

EXAMPLE 2

According to one method of preparing the composition of the present invention, the ascorbic acid is triturated at room temperature (not exceeding about 25° C.) with the sugar and potassium glutamate. This procedure produces a sort of coating or protective layer of sugar and glutamate around the labile ascorbic acid, thereby enhancing the stability of the latter. To the above mixture there is then added the potassium chloride, calcium chloride, potassium nitrite, and calcium nitrate, and the mixture is mechanically mixed at room temperature (not exceeding about 25° C.) and stored in air-tight containers for future use.

The weights of each ingredient are those set forth in Example 1 above.

When meat is to be cured, the composition is dissolved in an appropriate amount of water to form the pickling solution. The pickling composition is then artery or stitch pumped into the meat in a ratio of one gallon of pickling solution to 80 pounds of meat. The meat is then immersed in five gallons of cover pickle for 48 hours and then removed. The meat when it is removed from the cover pickle is fully cured.

EXAMPLE 3

According to another method of preparing the composition, the ascorbic acid and sugar are intimately triturated with the glutamate. Then the remaining ingredients are mixed together and incorporated with the triturated mixture. This composite mixture is then laid out and exposed in a damp atmosphere having a relative humidity about 50% for a few hours. Due to the hygroscopic nature of some of the ingredients in the composition, a cohesive mass is produced. The presence of sugar in the mixture aids in producing the desired cohesiveness. This cohesive mass is then passed through a wire screen mesh and the resulting granules are dried in a vacuum oven at a temperature not exceeding about 50° C. The dried material is then stored in moisture proof containers for future use.

This dried material is of a uniform composition and shows under a microscope a definite crystalline structure which is different from the composition produced when the individual ingredients are merely mechanically mixed together.

In using this composition, the granules are dissolved in an appropriate amount of water to produce the pickling composition. By way of example the granules are dissolved in sufficient water to produce the concentration shown in Table I for beef, ham, or tongue depending upon the meat being cured. This pickling composition is artery or stitch pumped into the meat, the ratio of solution to meat being about 1:10 by weight. In other words about 1 gallon of solution is sufficient for 80 pounds of meat. The meat is then finished off by utilizing the dry composition in a dry cure. The dry cure consists of rubbing the solid pickling composition on the meat and letting the meat lie in vats for 48 hours. In the dry cure the amount of each ingredient set forth in Table I for each gallon of the aqueous solution is sufficient to cure 16 pounds of meat. This produces a satisfactory cure. The meat is then washed with water preparatory to cooking.

When preparing the dry composition according to this example the relative weights of the ingredients are as set forth in Table I, or broadly, as set forth in Table II.

In each of the above examples the meats before curing are first preferably rinsed several times, about three, with cold water. Then the meats are soaked in cold water overnight to leach out as much as possible of the native sodium present in the meat. The meat is then cured. This soaking is highly desirable to produce cured meat having a minimum sodium content. As has been pointed out above the potassium and calcium content of meat may vary from carcass to carcass. Such variation may be due to the breed of animal, age of animal, diet of animal, or other variations in the growth of the animal. Because of such variations, before pickling, a sample is taken from each meat carcass and the potassium and calcium contents are determined therefrom, utilizing either the official method of the Association of Official Agricultural Chemists or by the flame photometer determination. Then the precise formulation of the pickling composition is adjusted in order to keep the potassium and calcium ratio of the pickling composition substantially the same as the ratio of the potassium and calcium present in the meat.

By way of further example the specific formulations set forth in Table I for beef, ham, and tongue were used respectively with beef showing upon analysis a potassium content of 360 mg. and a calcium content of 20 mg. per 100 grams of meat, showing a potassium to calcium ratio of 18–1; ham showing upon analysis a potassium content of 260 mg. and a calcium content of 13 mg. per 100 grams of meat, showing a potassium to calcium ratio of 20–1; tongue showing upon analysis a potassium content of 260 mg. and a calcium content of 31 mg. per 100 grams of meat, showing a potassium to calcium ratio of 9–1.

Beef having the above analysis and processed in accordance with Example 2 shows a final sodium content of 95 mg. per 100 grams as compared with 1,300 mg. per 100 grams when processing with conventional sodium containing nitrite-nitrate containing pickling compositions. Ham shows a sodium content of 160 mg. per 100 grams as compared with 1,100 mg. of sodium per 100 grams with conventional pickling agents. Tongue shows a sodium content of 100 mg. per 100 weight as compared with 1,600 mg. of sodium per 100 grams when processing with conventional pickling compositions.

Instead of potassium glutamate there may be used any other equivalent sodium-free protein hydrolysate in an equivalent amount, and therefore "sodium free protein hydrolysate" as used herein includes potassium glutamate and equivalent protein hydrolysates. Ascorbic acid as used herein includes iso-ascorbic acid as well as other equivalent isomers.

In the above examples some of the salts were used in the form of their hydrates. It is apparent that these hydrated salts may be substituted by the anhydrous salts making the necessary adjustments in the formulations.

It has been pointed out that according to one aspect of the present invention the potassium and calcium ratio of the sodium free nitrite-nitrate curing composition is about the same as the potassium and calcium ratio of the meat being cured. Therefore it follows the potassium and calcium ions do not have to be associated with particular salts in the proportion shown in the above examples. In other words it is only necessary that the calcium and potassium ions be balanced. The various anions with which the potassium and calcium are associated may be adjusted or varied as necessary. Of course, the various figures and ranges set forth in Tables I and II have to be adjusted accordingly. Such variations are within the scope of the present invention.

According to the present invention it has been discovered that meats can properly be cured without the addition of sodium chloride, sodium chloride heretofore being considered a necessity for fully curing meat. According to the prior practices if no sodium chloride is used the meats do not have good keeping qualities. To the contrary meats cured in accordance with the present invention not only do not possess the extremely salty taste of sodium chloride cured meat but the cured meats have an excellent "meaty" taste. Meats cured according to the present invention when vacuum packed in jars or containers have an unlimited shelf life without requiring the need for refrigeration. Thus it appears that the present invention has solved two problems in the art, first, the reduction of sodium in cured meat and, secondly, the production of cured meat having excellent flavor and keeping qualities.

It is apparent that the present invention is not limited to the specific meats disclosed above but is equally applicable to other meats. For example, the present invention may be used with bacon, veal, turkey, chicken, duck, etc. In other words "meat" as used in the generic sense referring to the tissues of animals.

Although in the preferred form of the invention, the ratio of potassium to calcium in the curing composition is about the same as the ratio of potassium to calcium in the meat being cured, the present invention also comprehends within its scope a curing composition comprising the essential ingredients as enumerated in Table II above but where the potassium to calcium ratio is not about the same as the potassium to calcium ratio of the meat being cured. Of course, such compositions, although they would adequately cure the meat to obtain a sodium free cure, would not produce cured meat of optimum characteristics.

I claim:

1. A sodium free nitrite-nitrate meat curing composition having a potassium and calcium content in about the same ratio as the potassium and calcium content of the meat to be cured.

2. A sodium free nitrite-nitrate meat curing composition comprising about 68–96 parts of potassium chloride, 8–15 parts calcium chloride, 13–19 parts sodium free protein hydrolysate, 2–3 parts potassium nitrite, 1–2 parts calcium nitrate, 0–21 parts sugar and 1–16 parts ascorbic acid, the parts being relative parts by weight.

3. A sodium free nitrite-nitrate meat curing composition comprising about 96 parts potassium chloride, 10 parts calcium chloride, 19 parts sodium free protein hydrolysate, 3 parts potassium nitrite, 1½ parts calcium nitrate, 21 parts sugar, and 1½ parts ascorbic acid, the parts being relative parts by weight.

4. A sodium free nitrite-nitrate meat curing composition comprising about 90 parts potassium chloride, 8 parts calcium chloride, 18 parts sodium free protein hydrolysate, 3 parts potassium nitrite, 1 part calcium nitrate, 21 parts sugar, and 1½ parts ascorbic acid, the parts being relative by weight.

5. A sodium free nitrite-nitrate meat curing composition comprising about 68 parts potassium chloride, 15 parts calcium chloride, 13 parts sodium free protein hydrolysate, 2 parts potassium nitrite, 2 parts calcium nitrate, 21 parts sugar, and 1½ parts ascorbic acid, the parts being relative parts by weight.

6. A method of curing meats comprising curing said meat with a sodium free nitrite-nitrate curing composition having a potassium and calcium content in about the same ratio as the potassium and calcium content of the meat being cured.

7. A method of curing meats comprising curing said meats with the composition of claim 2.

8. A method of curing meats comprising curing said meats with the composition of claim 3.

9. A method of curing meats comprising curing said meats with the composition of claim 4.

10. A method of curing meats comprising curing said meats with the composition of claim 5.

11. A method of preparing a sodium free nitrite-nitrate composition for curing meats which comprises triturating at about room temperature a mixture of ascorbic acid, sugar, and sodium free protein hydrolysate and mechanically mixing with the triturate potassium chloride, calcium chloride, potassium nitrite and calcium nitrate, said ingredients being in the relative proportions by weight of about 68–96 parts potassium chloride, 8–15 parts calcium chloride, 13–19 parts sodium free protein hydrolysate, 2–3 parts potassium nitrite, 1–2 parts calcium nitrate, 0–21 parts sugar and 1–16 parts ascorbic acid.

12. A method as recited in claim 11 wherein a final mixture is exposed to a damp atmosphere having a relative humidity of at least 50% and vacuum drying at a temperature not exceeding about 50° C.

13. A method of curing meats comprising curing said meats with a sodium free curing composition having a potassium and calcium content in about the same ratio as the potassium and calcium content of the meat being cured.

14. A sodium free nitrite-nitrate meat curing composition comprising potassium chloride, calcium chloride, sodium free protein hydrolysate, potassium nitrite, calcium nitrate and ascorbic acid.

15. A method of curing meats comprising curing said meats with a sodium free curing composition comprising potassium chloride, calcium chloride, sodium free protein hydrolysate, potassium nitrite, calcium nitrate and ascorbic acid.

References Cited in the file of this patent

UNITED STATES PATENTS

| | | |
|---|---|---|
| 2,471,144 | Davy | May 24, 1949 |
| 2,500,919 | Cahn | Mar. 21, 1950 |
| 2,688,555 | Komarik et al. | Sept. 7, 1954 |
| 2,688,556 | Komarik et al. | Sept. 7, 1954 |
| 2,742,366 | Power | Apr. 17, 1956 |
| 2,806,793 | Kemps | Sept. 17, 1957 |
| 2,823,132 | Sair | Feb. 11, 1958 |
| 2,829,056 | Kemmerer | Apr. 1, 1958 |